United States Patent
Kim et al.

(10) Patent No.: US 8,645,903 B2
(45) Date of Patent: Feb. 4, 2014

(54) APPARATUS AND METHOD FOR GENERATING USER INTERFACE BASED ON TASK SERVICE

(75) Inventors: Jun Hyeong Kim, Anyang-si (KR); Sang Do Park, Seoul (KR); Sung-Bae Cho, Seoul (KR); Jin-Hyuk Hong, Seoul (KR); Sungsoo Lim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1418 days.

(21) Appl. No.: 12/052,759

(22) Filed: Mar. 21, 2008

(65) Prior Publication Data
US 2009/0144735 A1    Jun. 4, 2009

(30) Foreign Application Priority Data
Dec. 3, 2007   (KR) .......................... 10-2007-0124584

(51) Int. Cl.
G06F 9/44   (2006.01)
G06F 3/00   (2006.01)

(52) U.S. Cl.
USPC ........... 717/100; 717/104; 717/105; 717/143; 715/762

(58) Field of Classification Search
None
See application file for complete search history.

(56) References Cited

U.S. PATENT DOCUMENTS

| | | | | |
|---|---|---|---|---|
| 6,058,434 A * | 5/2000 | Wilt et al. | ..................... | 719/310 |
| 6,127,941 A * | 10/2000 | Van Ryzin | ................... | 340/4.37 |
| 6,211,878 B1 * | 4/2001 | Cheng et al. | .................. | 715/760 |
| 7,137,099 B2 * | 11/2006 | Knight et al. | ................. | 717/100 |
| 7,562,307 B2 * | 7/2009 | Betts et al. | ..................... | 715/762 |
| 8,468,492 B1 * | 6/2013 | Frenkel | .......................... | 717/104 |
| 2003/0095211 A1 * | 5/2003 | Nakajima | ..................... | 348/734 |
| 2003/0227568 A1 | 12/2003 | Stahl et al. | | |
| 2004/0133876 A1 * | 7/2004 | Sproule | ......................... | 717/105 |
| 2005/0097503 A1 * | 5/2005 | Zintel et al. | ................... | 717/100 |

(Continued)

FOREIGN PATENT DOCUMENTS

| | | |
|---|---|---|
| JP | 2004-140811 | 5/2004 |
| KR | 10-2004-0006855 | 1/2004 |
| KR | 10-2005-0091992 | 9/2005 |
| KR | 10-2006-0014953 | 2/2006 |

(Continued)

OTHER PUBLICATIONS

Jeffrey Nichols "Generating Remote Control Interfaces for Complex Applicances" Jan. 2002, pp. 1-12, [Online], [Retrieved from Internet on Jan. 18, 2012], <http://repository.cmu.edu/cgi/viewcontent.cgi?article=2305&context=compsci>.*

(Continued)

*Primary Examiner* — Thuy Dao
*Assistant Examiner* — Ziaul A Chowdhury
(74) *Attorney, Agent, or Firm* — NSIP Law (57) ABSTRACT

An apparatus for generating a task-based User Interface (UI) includes a task ontology unit for maintaining task information with respect to the task, a device ontology unit for maintaining device information with respect to a device, a UI description generation unit for reading the task information and/or the device information using the task ontology unit and/or the device ontology unit, respectively, and generating UI description information from the read task information and/or the read device information, the UI description information being made by a task-based language, and a UI description parsing unit for parsing the UI description information to output the task-based UI.

14 Claims, 7 Drawing Sheets

(56) References Cited

U.S. PATENT DOCUMENTS

| | | | |
|---|---|---|---|
| 2005/0172276 A1* | 8/2005 | Eilebrecht | 717/143 |
| 2006/0048194 A1* | 3/2006 | Poslinski | 725/81 |
| 2006/0161865 A1* | 7/2006 | Scott et al. | 715/810 |
| 2006/0259864 A1* | 11/2006 | Klein et al. | 715/738 |
| 2007/0038737 A1* | 2/2007 | Keller et al. | 709/224 |
| 2007/0038992 A1* | 2/2007 | Mahasintunan | 717/174 |
| 2007/0124698 A1* | 5/2007 | Majumder | 715/811 |
| 2007/0130607 A1* | 6/2007 | Thissen et al. | 725/132 |
| 2007/0176820 A1* | 8/2007 | Vidal | 341/176 |
| 2007/0252721 A1* | 11/2007 | Geurts | 340/825.22 |

FOREIGN PATENT DOCUMENTS

| | | | |
|---|---|---|---|
| KR | 10-2006-0051203 A | 5/2006 | |

OTHER PUBLICATIONS

Giulio Mori et al., "Design and Development of Multidevice User Interfaces through Multiple Logical Descriptions", [Online], IEEE Aug. 2004, pp. 1-14, [Retrieved from Internet on Sep. 26, 2013], <http://ieeexplore.ieee.org/stamp/stamp.jsp?tp=&arnumber=1316868>.*

James D. Foley et al., "Coupling A UI Framework with Automatic Generation of Context-Sensitive Animated Help", [Online], ACM 1990, pp. 152-166, [Retrieved from Interneet on Sep. 26, 2013], <http://ist.mns.kyutech.ac.jp/miura/papers/jedemo/p152-sukaviriya-UIST90.pdf>.*

Jeffrey Nichols et al., "Controlling Home and Office Appliances with Smartphones", [Online], IEEE 2006, pp. 60-67, [Retrieved from Internet on Sep. 26, 2013], <http://ieeexplore.ieee.org/stamp/stamp.jsp?tp=&arnumber=1673368>.*

Fabrizio Lamberti et al., "Extensible GUIs for Remote Application Control on Mobile Devices", [Online], IEEE 2008, pp. 50-57, [Retrieved from Innterent on Sep. 26, 2013], <http://ieeexplore.ieee.org/stamp/stamp.jsp?tp=&arnumber=4557956>.*

Korean Office Action issued Aug. 13, 2013 in counterpart Korean Application No. 10-20070124584. (4 pages, in Korean).

* cited by examiner

APPARATUS AND METHOD FOR GENERATING USER INTERFACE BASED ON TASK SERVICE

CROSS-REFERENCE TO RELATED APPLICATION

This application claims the benefit under 35 U.S.C. §119(a) of a Korean Patent Application No. 10-2007-0124584, filed on Dec. 3, 2007, in the Korean Intellectual Property Office, the entire disclosure of which is incorporated herein by reference.

TECHNICAL FIELD

Apparatuses and Methods consistent with the following description relate to generating a User Interface (UI) based on a task. More particularly, apparatuses and methods consistent with the following description relate to generating a UI based on a task, which analyzes semantic information between a task, a device, and an interface based on an ontology to thereby provide the UI to a user for each task.

BACKGROUND

Currently, many home appliances such as a television, a video, an air conditioner, a refrigerator, and the like are used, and accordingly, different remote controls for operating these home appliances are required. A user is required to acquire an operation method for operating a new remote control along with an increase in a number of the corresponding new home appliances, and consider whether the interoperation between the new home appliances and existing home appliances is achieved. For example, in the case of a home theater, a user is required to simultaneously operate at least one device such as a cable or satellite television set-top box, a digital video disk (DVD) player, a television, an audio, a video, a digital internet video express (DivX) player, and the like in order to watch movies, and also select an appropriate remote control in order to perform desired functions. In particular, since each remote control has different positions and shapes of its button and different operation methods, the user may be confused by this. Also, sometimes the user is required to simultaneously operate a plurality of remote controls in order to perform a specific function. Attempts for integrating a plurality of remote controls so as to simultaneously operate different home appliances have been made by several companies. Specifically, a current television remote control serves to simultaneously operate devices such as a DVD player, a video, an audio, and the like as well as a television by shifting its operation mode. However, this remote control can be exclusively used only for a device defined in advance, and cannot be applicable to a new device.

Accordingly, universal remote controls have been developed, which can remember an infrared signal of each device to control devices. These universal remote controls may be operable even in a new device product by directly remembering the infrared signal, however, the infrared signal is disadvantageously required to be individually set by the user.

SUMMARY

In one general aspect, there is provided an apparatus and method for generating a task-based user interface (UI), that allows a user to perform desired services based on semantic information exhibited in an interface even without being aware of the complex connection relation between devices and each setting method of the devices.

In another aspect, there is provided an apparatus for generating a task-based UI, in which a task-based language providing services for each task is supported, and a description made by the task-based language is analyzed, thereby dynamically implementing the task-based UI according to circumferences.

In still another aspect, there is provided an apparatus for generating a task-based UI, in which semantic information between a task, a device, and an interface is analyzed based on each ontology constructed in advance with respect to a task and device, whereby the task-based UI providing services for each task to a user is dynamically generated according to a peripheral circumference of the user and the task.

In yet another aspect, there is provided an apparatus for generating a task-based UI, in which independence between respective description sections composing UI description information through the connection being based on semantic information is maintained, thereby ensuring expandability of the apparatus.

In still yet another aspect, there is provided an apparatus for generating a task-based user interface (UI), which includes a task ontology unit for maintaining task information with respect to the task, a device ontology unit for maintaining device information with respect to a device, a UI description generation unit for reading the task information and/or the device information using the task ontology unit and/or the device ontology unit, respectively, and generating UI description information from the read task information and/or the read device information, the UI description information being made by a task-based language, and a UI description parsing unit for parsing the UI description information to output the task-based UI.

In still another aspect, there is provided a method for generating a task-based user interface (UI), which includes receiving task selection input information from a user, reading task information corresponding to the task selection input information from a task ontology unit and device information from a device ontology unit, respectively, generating UI description information from the task information and the device information through a UI description generation unit, and parsing the UI description information through a UI description analysis unit to output the task-based UI.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Terms used herein are used to appropriately describe exemplary embodiments, and thus may be different depending upon a user and an operator's intention, or practices of application fields. Therefore, the terms must be defined based on descriptions made through the specification.

A task-based language disclosed herein may describe device functions between a user and an apparatus for generating a user interface (UI) with eXtensible Markup Language (XML) which is readily appreciated, and also describe a variable capable of remembering a connection state of the device and a device state. Also, the task-based language may include semantic information capable of being appropriately adjusted depending on the device state and the connection state.

Figure 1:
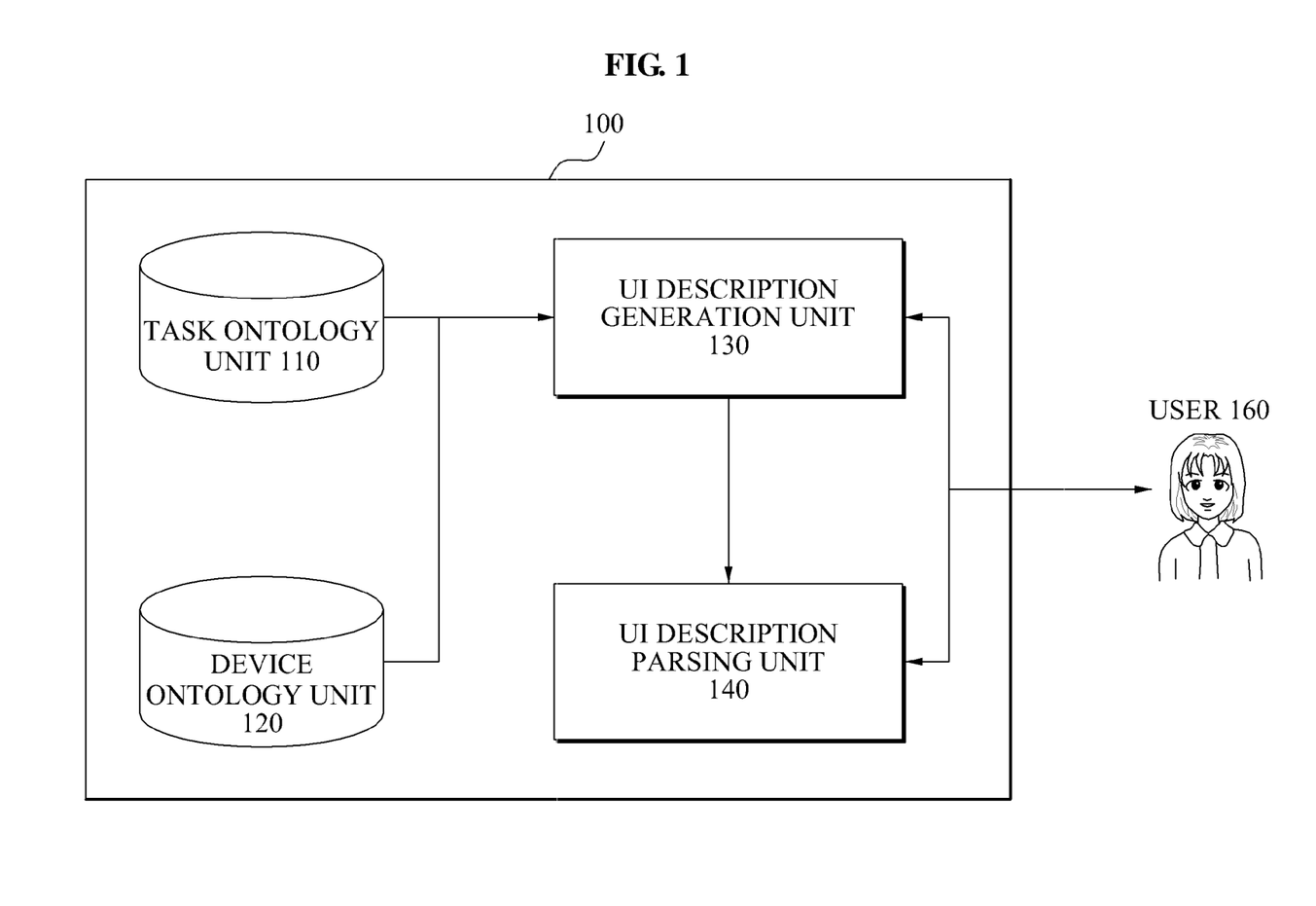
FIG. 1 is a block diagram illustrating an apparatus for generating a task-based user interface (UI) according to an exemplary embodiment.

FIG. 1 is a block diagram illustrating an apparatus 100 for generating a task-based user interface (UI) according to an exemplary embodiment.

Referring to FIG. 1, the apparatus 100 includes a task ontology unit 110, a device ontology unit 120, a UI description generation unit 130, and a UI description parsing unit 140.

The task ontology unit 110 maintains task information with respect to the task, and the device ontology unit 120 maintains device information with respect to a device.

The UI description generation unit 130 reads the task information and/or the device information using the task ontology unit 110 and/or the device ontology unit 120, respectively, and generates UI description information from the read task information and/or the read device information. According to an aspect, the UI description information is made by a task-based language.

The UI description generation unit 130 performs a mapping process with respect to task semantic information being analyzed using the task information, and with respect to device semantic information being analyzed using the device information, respectively. In this instance, the task semantic information includes task functional information about the task, and the device semantic information includes device functional information about the device.

Specifically, the UI description generation unit 130 analyzes the task functional information and the device functional information to automatically map the task functional information and the device functional information. More specifically, the UI description generation unit 130 analyzes similarity between the devices based on the task semantic information and/or the device semantic information to thereby perform the mapping process, and the similarity is analyzed based on a Jaccard coefficient.

Also, the UI description generation unit 130 integrates task interface information being analyzed using the task information with device interface information being read using the device information to thereby generate the UI description information.

Figure 2:
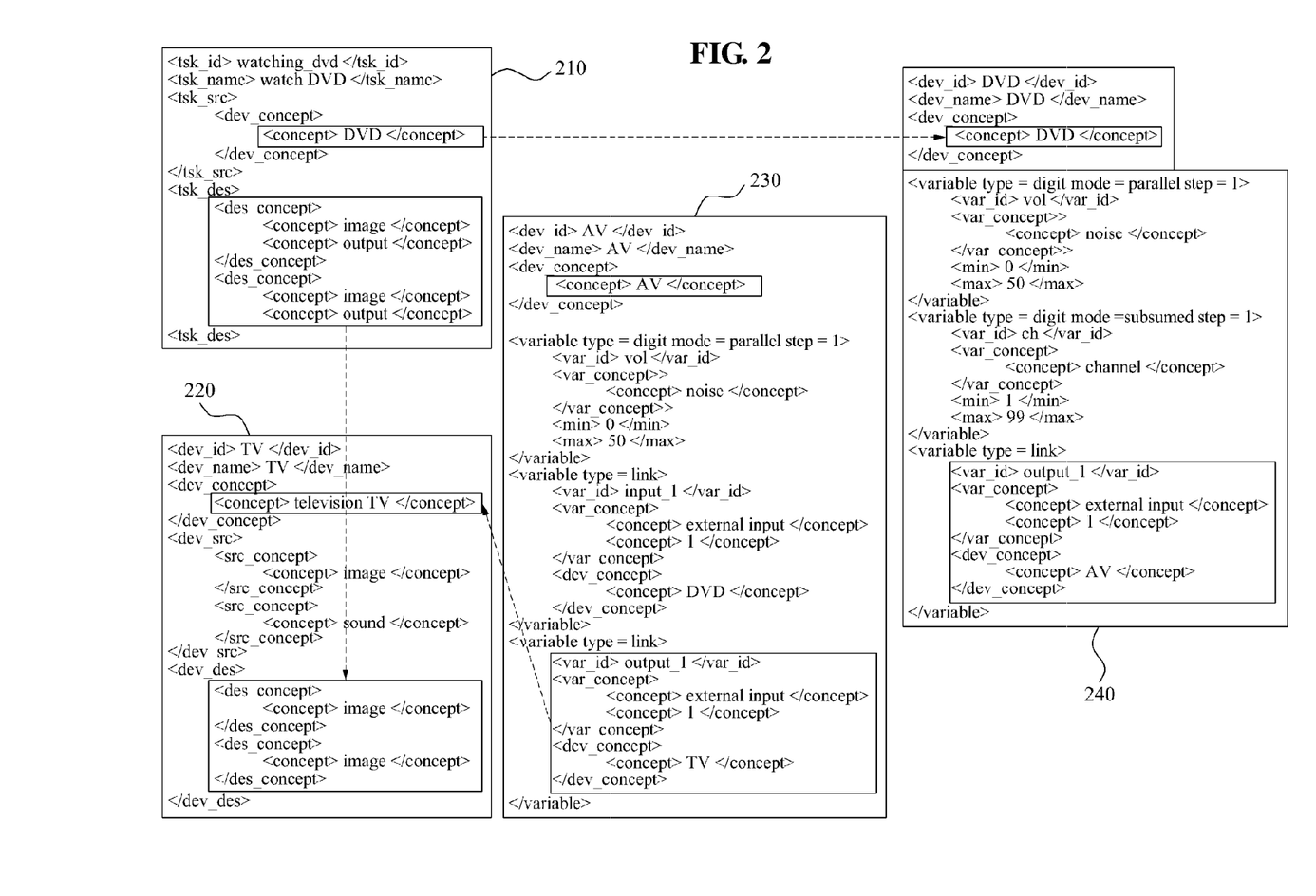
FIG. 2 illustrates a relation in which semantic information acquired from a task ontology unit and a device ontology unit is loaded to a task selected from a user to thereby generate UI description information according to an exemplary embodiment.

FIG. 2 illustrates a relation in which semantic information acquired from a task ontology unit and a device ontology unit is loaded to a task selected from a user to thereby generate UI description information made by a task-based language according to an exemplary embodiment.

Referring to FIG. 2, the UI description information may be made by a task-base language, and the task-based language includes a device description section (<device>) for describing a relationship with the device, an internal state of the device, and a variable for controlling a function of the device, a task description section (<task>) for describing the task information about operation providing services to a user, and an interface description section (<interface>) for describing the task-based UI corresponding to the device information and the task information. The task description section includes connection information with the device being based on task semantic information, and the interface description section includes interface connection information being based on device semantic information, and/or the task semantic information. Also, the interface description section may include design form information being analyzed using the interface connection information.

Task information 210, selected by a user using the apparatus for generating the task-based UI 100, is made by a task-based language. The task information 210 includes semantic information including the task functional information performed by the task using a predetermined task name of 'watch DVD'. The UI description generation unit 130 loads task semantic information included in the task information 210 and device semantic information of device information 220, 230, and 240 being read from the device ontology unit 120, when a specific task is selected and inputted by the user. Specifically, the UI description generation unit 130 loads the device semantic information of the device information 220, 230, and 240 corresponding to a relationship with the device, an internal state of the device, and a variable for controlling a function of the device.

The UI description generation unit 130 loads television device information 220, audio video (AV) device information 230, and digital video disk (DVD) device information 240 which are capable of being loaded to the task information 210. The task information 210 includes task semantic information performing a specific function, and the UI description generation unit 130 loads the device semantic information of the device information 220, 230, and 240 which may be mapped with the task semantic information. As illustrated in FIG. 2, the semantic information of the television device information 220, the AV device information 230, and the DVD device information 240 is loaded. In this instance, the television device information 220 may be mapped with 'image output' and 'sound output', which correspond to the task semantic information of the task information 210. A mapping process performed after the task semantic information for generating the task-based UI description information and the device semantic information is loaded will be described in detail with reference to FIG. 3.

Figure 3:
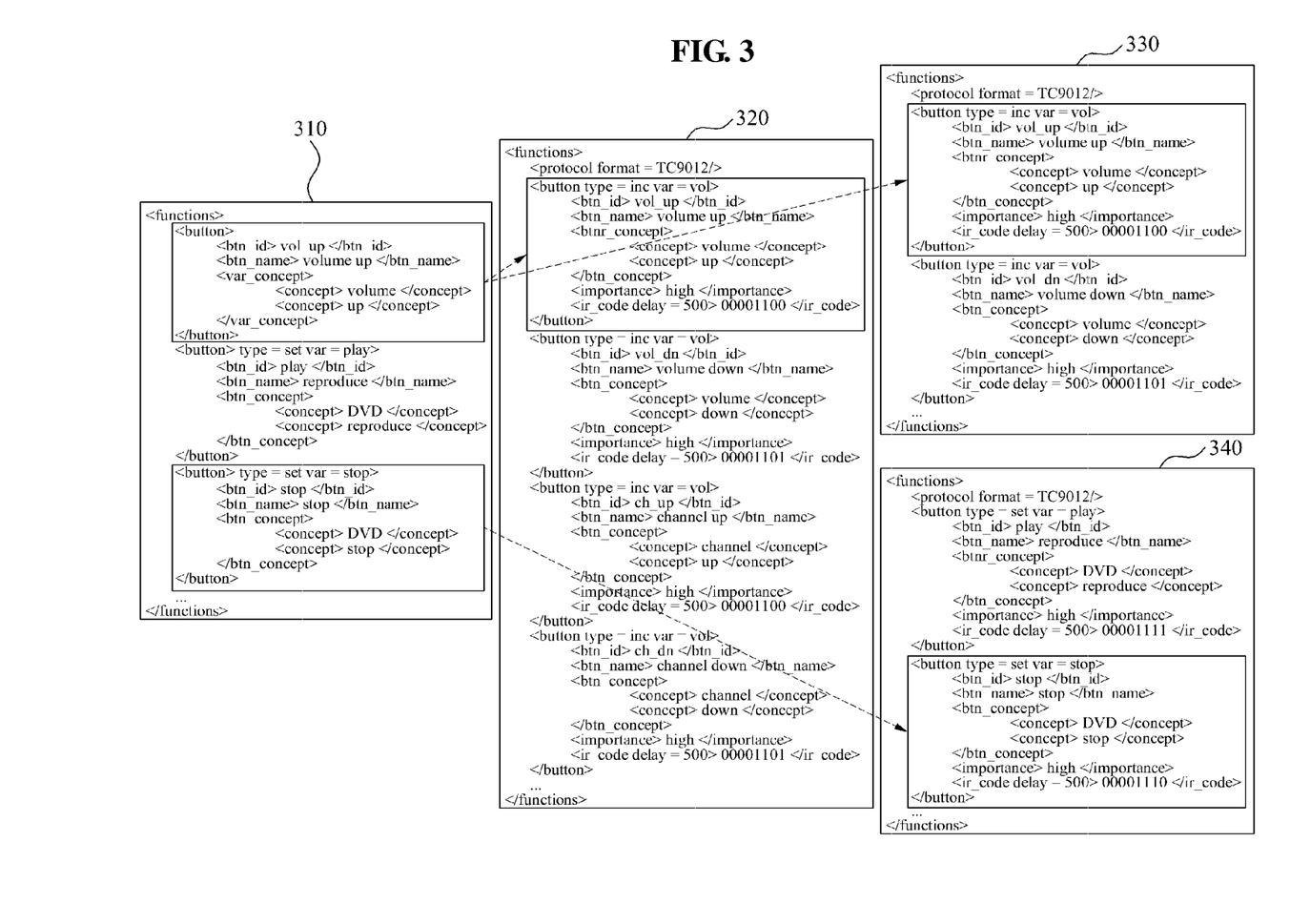
FIG. 3 illustrates a relation in which task functional information included in UI description information and device functional information included in device information are mapped according to an exemplary embodiment.

FIG. 3 illustrates a relation in which task functional information included in UI description information and device functional information included in device information are mapped according to an exemplary embodiment.

Referring to FIG. 3, so that the UI description information capable of being made by the task-based language including the device description section, the task description section, and the interface description section is generated, the UI description generation unit 130 maps task functional information included in the UI description information and device functional information included in the device information.

Specifically, the UI description generation unit 130 generates interface connection information based on the device semantic information and/or the task semantic information, and performs a mapping process for controlling the relationship with the device, the internal state of the device, and the function of the device in order to generate the UI description information including the interface connection information. In this case, the UI description generation unit 130 analyzes similarity between the devices based on the task semantic information and/or the device semantic information. Also, when the mapping process is performed, the similarity is analyzed based on a Jaccard coefficient.

For example, with reference to FIG. 3, it is assumed that task information 310 of 'watch DVD' describing task functional information is defined as semantic information such as 'volume up', 'DVD play', 'DVD stop', and the like, and television device information 320 describing functional information of the television device is defined as semantic information such as 'volume up', 'channel up', 'volume down', and the like. Also, it is assumed that AV device information 330 describing functional information of the AV device is defined as semantic information such as 'volume up', 'volume down', and the like, and DVD device information 340 describing functional information of the DVD device is defined as semantic information such as 'reproduction', 'stop', and the like. The semantic information such as 'volume up' is defined in the television device information 320, and the AV device information 330, respectively, each which has a similar function to each other. In this case, a device description section of a currently connected device is analyzed based on the function described in the device description section, and UI description information is generated in such a manner that different functions are connected to be internally and automatically performed.

Specifically, similarity between the devices (for example, the television device and the AV device in FIG. 3) may be acquired by the Jaccard coefficient, which is represented by $$D_{ij} = \frac{n(c_i^d \cap c_j^d)}{n(c_i^d \cup c_j^d)}, \quad \text{[Equation 1]}$$

where $D_{ij}$ denotes similarity between a device of i and another device of j, and $c_i^d$ denotes semantic information of the device of i.

Variable similarity expresses a relationship between variables of respective devices, and thus includes information about device similarity, which may be represented by $$Var_{ij} = D_{ij} \times \frac{n(c_i^{var} \cap c_j^{var})}{n(c_i^{var} \cup c_j^{var})}. \quad \text{[Equation 2]}$$

where $Var_{ij}$ denotes similarity between a variable of i and another variable of j, and $c_i^{var}$ denotes semantic information of the variable of i.

Variable value similarity expresses similarity between values of respective variables, and may be acquired by semantic information of a variable and semantic information of a value, which may be represented by $$V_{ij} = \frac{n(c_i^{var} \cap c_j^{var})}{n(c_i^{var} \cup c_j^{var})} \times \frac{n(c_i^v \cap c_j^v)}{n(c_i^v \cup c_j^v)}, \quad \text{[Equation 3]}$$

where $V_{ij}$ denotes similarity between a value of i and another value of j, and $c_i^v$ denotes semantic information of the value of i.

Referring again to FIG. 1, in order to generate UI description information of the task-based language, the UI description generation unit 130 generates connection information connected such that the internal operation of the UI description generation unit 130 is substantially performed by mapping the task functional information defined in the task description section included in the task-based language with device functional information included in the task-based language about a currently operated device. In this case, values of semantic information used in an application environment are defined in advance. The device needs interface information for an operation other than functional information and a device attribute defined in the device description section, and the interface information is defined in the interface description section of the UI description information included in the task-based language. The interface description section describes the task-based UI information corresponding to the device information and the task information, and includes design form information being analyzed using the interface information (connection information). For example, in the case of 'volume up' and 'volume down', that is, semantic information of the device description section, the interface description section includes 'volume up' and 'volume down', that is, the corresponding semantic information, and defines a configuration and a design form between the semantic information. These semantic information is expressed as a form of a button on the UI interface provided to a user.

According to certain exemplary embodiments disclosed herein, independence between respective description sections composing the UI description information is maintained through the connection being based on semantic information, thereby ensuring expandability of the apparatus for generating the task-based UI.

The UI description parsing unit 140 parses the UI description information to output a task-based UI.

The task-based UI includes a task hierarchy including a task list available to a user, a basic interface hierarchy providing a basic UI corresponding to the task list, and a detailed interface hierarchy, which will be described in detail with reference to FIGS. 5 through 7.

Figure 4:
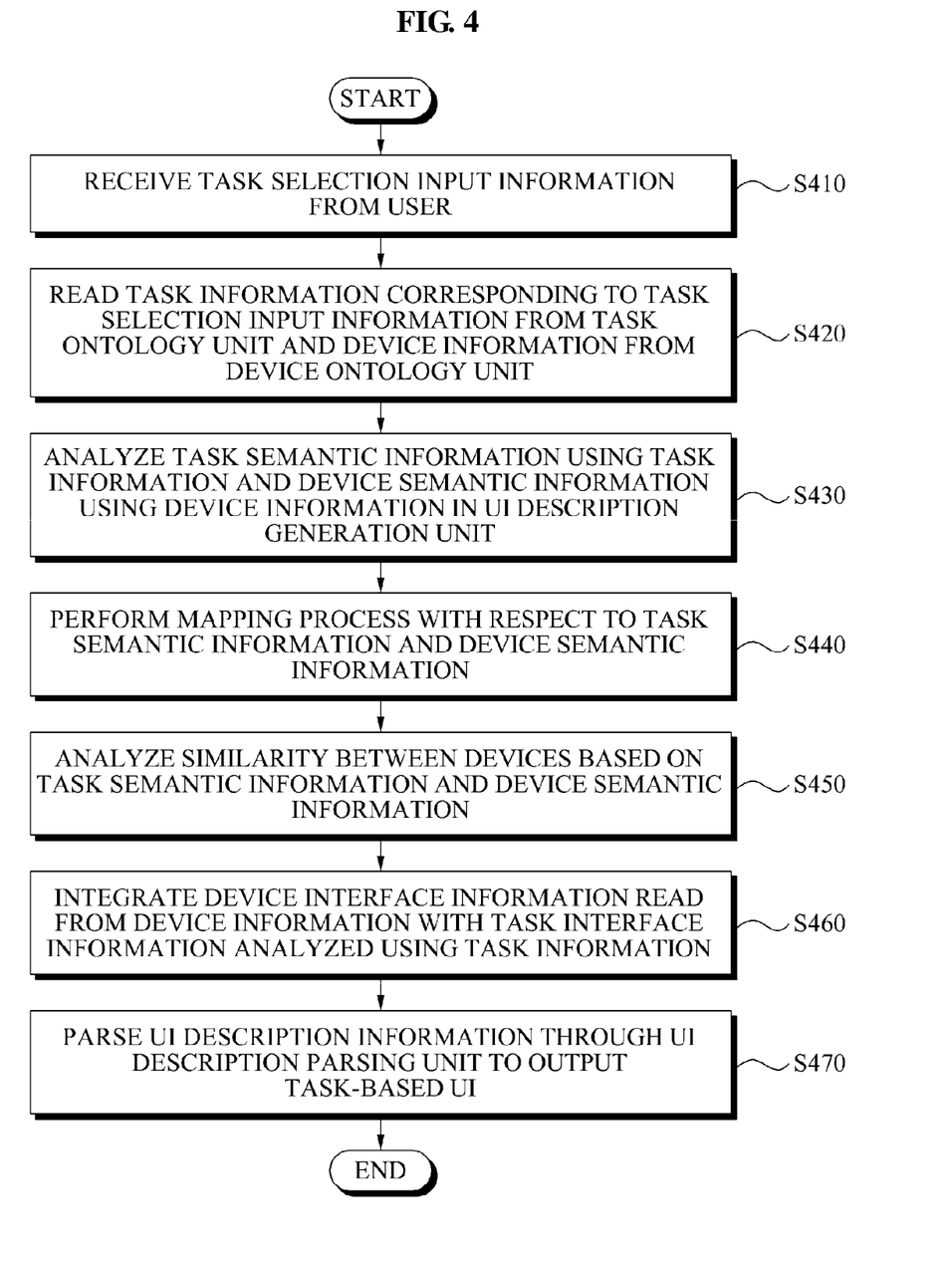
FIG. 4 is a flowchart illustrating a process for generating a task-based UI according to an exemplary embodiment.

FIG. 4 is a flowchart illustrating a process for generating a task-based UI according to an exemplary embodiment.

Referring to FIG. 4, task selection input information is received from a user in operation S410, task information corresponding to the task selection input information is read from the task ontology unit, and device information is read from the device ontology unit, respectively, in operation S420.

In operation S430, task semantic information is analyzed using the task information, and also device semantic information is analyzed using the device information, so that UI description information is generated by the UI description generation unit using the task information and the device information. In operation S440, a mapping process with respect to the task semantic information and the device semantic information is performed.

In operation S450, the UI description generation unit analyzes similarity between the devices based on the task semantic information and the device semantic information. In this instance, the similarity is analyzed based on the Jaccard coefficient as described above.

In operation S460, device interface information being read from the device information and task interface information being analyzed using the task information are integrated, and in operation S470, the UI description information is parsed by the UI description parsing unit to thereby output a task-based UI.

Figure 5:
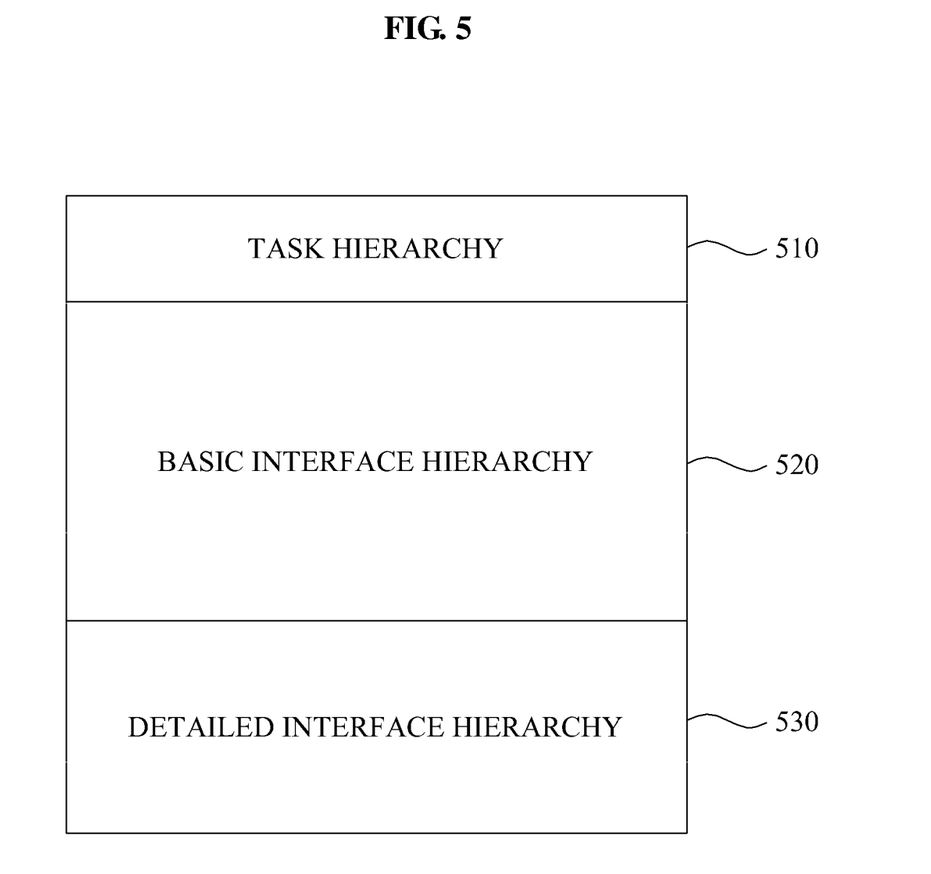
FIG. 5 illustrates a configuration of a task-based UI outputted by a UI description parsing unit according to an exemplary embodiment.

FIG. 5 illustrates a configuration of a task-based UI outputted by a UI description parsing unit according to an exemplary embodiment.

Referring to FIG. 5, the task-based UI according an exemplary embodiment includes a task hierarchy 510, a basic interface hierarchy 520, and a detailed interface hierarchy 530.

The task hierarchy 510 provides a task list with respect to a task available to a user, the basic interface hierarchy 520 provides a basic UI corresponding to the task list, and the detailed interface hierarchy 530 provides a detailed interface for detailed functions other than the basic UI, whose examples will be described in detail with reference to FIGS. 6 and 7.

Figure 6:
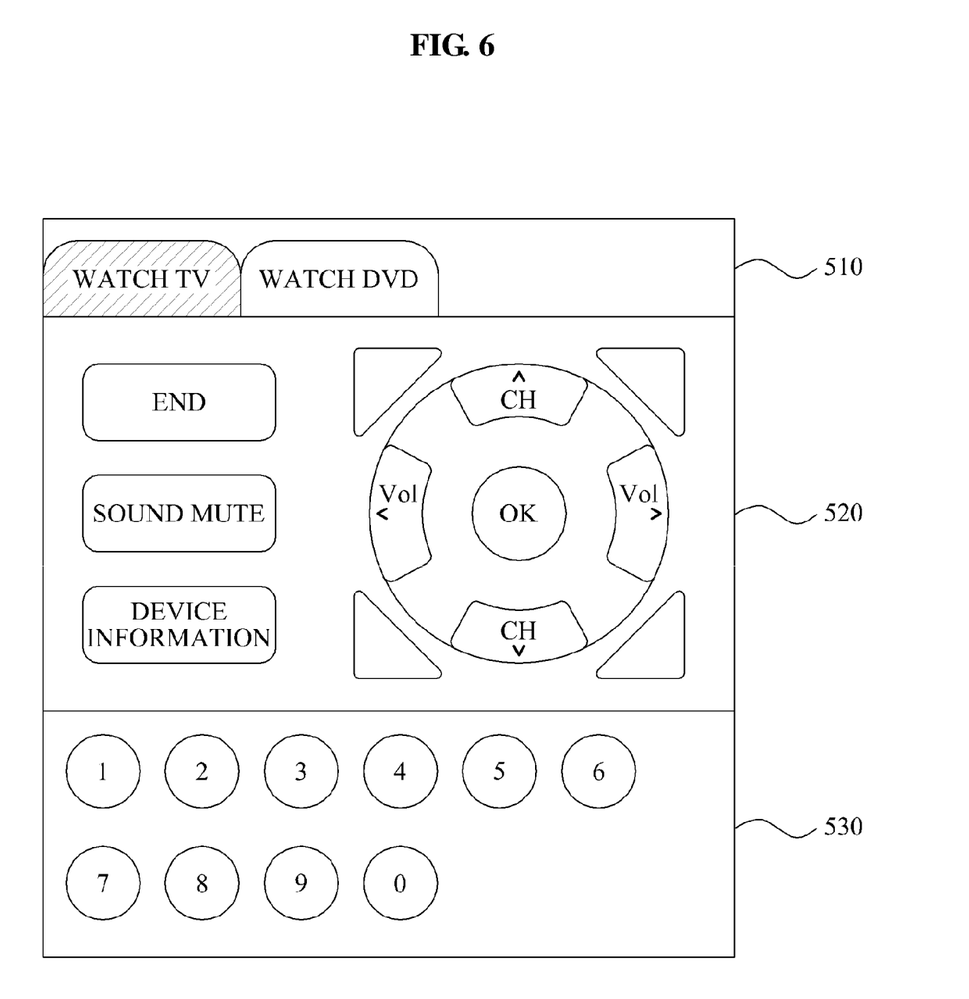
FIGS. 6 and 7 illustrate an example of a task-based UI which may be provided to a user by an apparatus for generating a task-based UI according to an exemplary embodiment.
Figure 7:
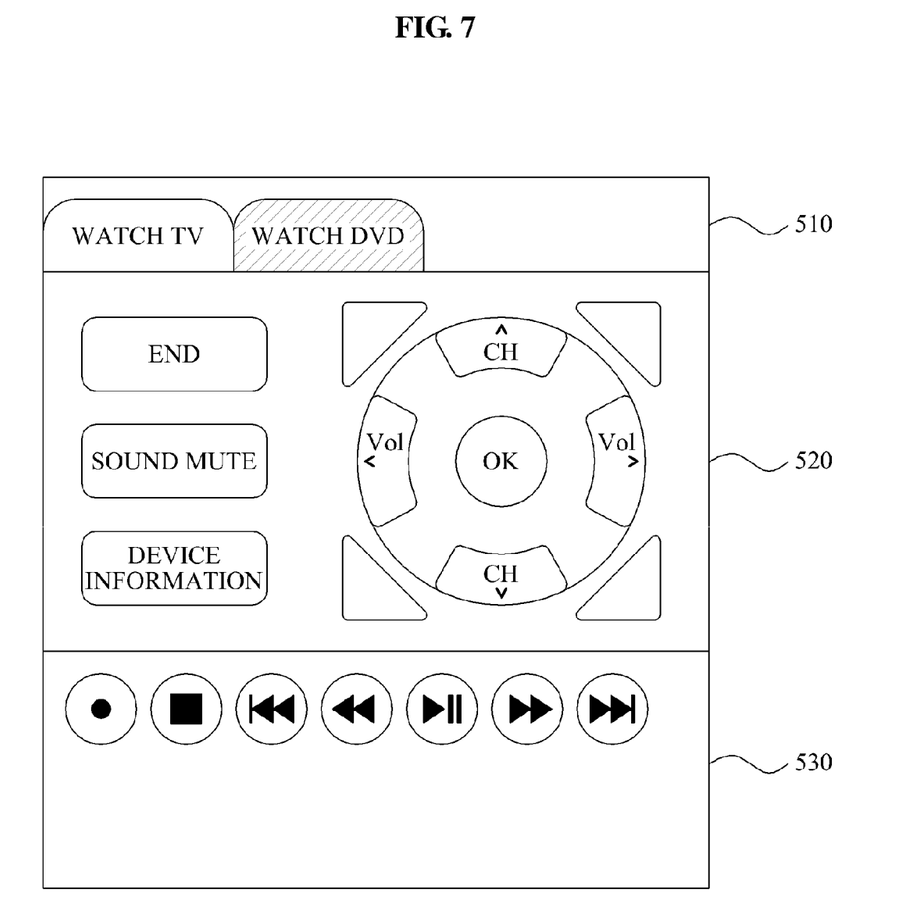

FIGS. 6 and 7 illustrate an example of a task-based UI which can be provided to a user by an apparatus for generating a task-based UI according to an exemplary embodiment.

FIG. 6 is an example of a task of 'watch television' of a generated task-based UI, and FIG. 7 is an example of a UI with respect to a task of 'watch DVD'.

Referring to FIGS. 6 and 7, a task list such as 'watch television' and 'watch DVD' capable of being selected by a user is provided in the task hierarchy 510, and a basic UI corresponding to 'watch television, and 'watch DVD' is provided in the basic interface hierarchy 520. Also, in the case of the task of 'watch television', a channel selection input section capable of converting a channel is provided in the detailed interface hierarchy 530.

As illustrated in FIG. 7, the task of 'watch DVD' may control a task including a television, a DVD player, and an AV receiver. It is assumed that an image output of the DVD player is connected with an image input component of the television, a sound output of the DVD player is connected with a first terminal of the AV receiver, and a sound output of the AV receiver is connected with a 5.1 channel speaker. In this regard, when a user selects the task of 'watch DVD' shown in FIG. 7, a series of operations such as power on the DVD player→power on the television→power on the AV receiver→power on the 5.1 channel speaker→setting of the image input component of the television→setting of the first terminal of the AV receiver, and the like are performed. A volume up (Vol>)) button may be connected with a volume increase function of a device whose volume value is set to be lowest, from among the DVD player, the AV receiver, and the 5.1 channel speaker. Conversely, a volume down (Vol<) button may be connected with a volume decrease function of a device whose volume value is set to be highest from among the same. Thus, the user may perform the task of 'watch DVD' using the task-based UI without a separate setting.

The methods described above including the method for generating the task-based UI may be recorded, stored, or fixed in one or more computer-readable media including program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments.

According to certain embodiment described above, there is provided an apparatus and method for generating a task-based user interface (UI), that allows a user to perform desired services based on semantic information exhibited in an interface even without being aware of the complex connection relation between devices and each setting method of the devices.

There is also provided an apparatus for generating a task-based UI, in which a task-based language providing services for each task is supported, and a description made by the task-based language is analyzed, thereby dynamically implementing the task-based UI according to circumferences.

There is also provided an apparatus for generating a task-based UI, in which semantic information between a task, a device, and an interface is analyzed based on each ontology constructed in advance with respect to a task and device, whereby the task-based UI providing services for each task to a user is dynamically generated according to a peripheral circumference of the user and the task.

There is also provided an apparatus for generating a task-based UI, in which independence between respective description sections composing UI description information through the connection being based on semantic information is maintained, thereby ensuring expandability of the apparatus.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating a task-based user interface (UI) performed at a processor, the method comprising:
receiving task selection input information from a user;
reading task information corresponding to the task selection input information from a task ontology unit and device information from a device ontology unit, respectively;
generating UI description information from the task information and the device information through a UI description generator, the UI description information being made by a task-based language; and
parsing the UI description information through a UI description analysis unit to output the task-based UI; and analyzing a similarity between the devices based on at least one of task semantic information and device semantic information to automatically map the at least one of the task semantic information and the device semantic information, wherein the task-based language includes a device description section configured to describe a relationship with the device, an internal state of the device, and a variable for controlling a function of the device, a task description section configured to describe the task information being the processor configured to provide services to a user, and an interface description section configured to describe the task-based UI corresponding to the device information and the task information.

2. The method of claim 1, wherein the generating includes:
analyzing the task semantic information from the task information and the device semantic information from the device information, respectively; and
performing a mapping process with respect to the task semantic information and the device semantic information.

3. The method of claim 1, wherein the similarity is analyzed based on a Jaccard coefficient.

4. The method of claim 1, wherein the generating includes integrating device interface information being read from the device information with task interface information being analyzed from the task information.

5. An apparatus for generating a task-based user interface (UI), the apparatus comprising:
a task ontology unit configured to maintain task information with respect to the task;
a device ontology unit configured to maintain device information with respect to a device;
a UI description generator configured to
read at least one of the task information and the device information using the task ontology unit or the device ontology unit, respectively,
generate UI description information from at least one of the read task information and the read device information, the UI description information being made by a task-based language, and
analyze similarity between the devices based on at least one of task semantic information and device semantic information to automatically map the at least one of the task semantic information and the device semantic information; and
a UI description parser configured to parse the UI description information to output the task-based UI,
wherein at least one of the task ontology unit, the device ontology unit, the UI description generator and the UI description parser is implemented by a processor of the apparatus, and
wherein the task-based language includes a device description section configured to describe a relationship with the device, an internal state of the device, and a variable for controlling a function of the device, a task description section configured to describe the task information being the processor configured to provide services to a user, and an interface description section configured to describe the task-based UI corresponding to the device information and the task information.

6. The apparatus of claim 5, wherein the UI description generator performs a mapping process with respect to the task semantic information being analyzed using the task information, and with respect to the device semantic information being analyzed using the device information, respectively.

7. The apparatus of claim 6, wherein:
the task semantic information includes task functional information about the task, and the device semantic information includes device functional information about the device, and
the UI description generator analyzes the task functional information and the device functional information to automatically map the task functional information and the device functional information.

8. The apparatus of claim 5, wherein the similarity is analyzed based on a Jaccard coefficient.

9. The apparatus of claim 5, wherein the UI description generator integrates task interface information being analyzed using the task information with device interface information being read using the device information to generate the UI description information.

10. The apparatus of claim 5, wherein:
the task description section includes connection information with the device being based on task semantic information, and
the interface description section includes interface connection information being based on at least one of device semantic information and the task semantic information.

11. The apparatus of claim 10, wherein the interface description section includes design form information being analyzed using the interface connection information.

12. The apparatus of claim 5, wherein
the task-based UI includes a task hierarchy including a task list available to a user, a basic interface hierarchy providing a basic UI corresponding to the task list, and a detailed interface hierarchy providing a detailed interface for detailed functions other than the basic UI.

13. The apparatus of claim 5, wherein the task-based language is an eXtensible Markup Language (XML).

14. A non-transitory computer-readable storage medium storing a program to generate a task-based user interface (UI), comprising instructions to cause a computer to:
receive task selection input information from a user;
read task information corresponding to the task selection input information from a task ontology unit and device information from a device ontology unit, respectively;
generate UI description information from the task information and the device information through a UI description generator, the UI description information being made by a task-based language;
parse the UI description information through a UI description analysis unit to output the task-based UI; and
analyze a similarity between the devices based on at least one of task semantic information and device semantic information to automatically map the at least one of the task semantic information and the device semantic information,
wherein the task-based language includes a device description section configured to describe a relationship with the device, an internal state of the device, and a variable for controlling a function of the device, a task description section configured to describe the task information being the processor configured to provide services to a user, and an interface description section configured to describe the task-based UI corresponding to the device information and the task information.

* * * * *